United States Patent [19]
Tsai et al.

[11] Patent Number: 6,011,354
[45] Date of Patent: Jan. 4, 2000

[54] FLUORESCENT COLOR LAMP FOR LCD PANEL

[75] Inventors: Kuang-Lung Tsai; Chie-Ching Lin; Chen-Lung Kuo, all of Hsinchu, Taiwan

[73] Assignee: Industrial Technology Research Institute, Chutung, Taiwan

[21] Appl. No.: 09/031,811

[22] Filed: Feb. 27, 1998

[51] Int. Cl.[7] .................................................. H01J 17/16
[52] U.S. Cl. ............................................ 313/634; 313/493
[58] Field of Search .................................. 313/492, 493, 313/634, 635

[56] References Cited

U.S. PATENT DOCUMENTS 5,319,282  6/1994  Winsor ..................................... 313/493

*Primary Examiner*—Vip Patel
*Attorney, Agent, or Firm*—Tung & Associates

[57] ABSTRACT

The present invention discloses a flat fluorescent color lamp for liquid crystal display panel illumination which utilizes a lamp body constructed of at least three serpentine-shaped channels wherein each of the at least three channels exhibits a primary color of red, green or blue by filling the channels with a suitable fluorescent powder and energizing the gas contained in the channels by an electrical discharge and thus generating the desirable colored lights. The present invention flat fluorescent color lamp combines the functions of a backlight and color filters into a single device that can be advantageously manufactured.

20 Claims, 3 Drawing Sheets

FLUORESCENT COLOR LAMP FOR LCD PANEL

FIELD OF THE INVENTION

The present invention generally relates to a fluorescent color lamp for LCD panel illumination and more particularly, relates to a flat fluorescent color lamp for a liquid crystal display panel illumination that is constructed by a multiple number of serpentine-shaped channels each representing a color of red, green or blue for illuminating a display panel such that the use of additional colored filters are not required.

BACKGROUND OF THE INVENTION

In the construction of liquid crystal display (LCD) panels, a method of illumination must be utilized since the liquid crystal itself does not illuminate. The illumination is also important when the available lighting for viewing a LCD is insufficient. In order to make large LCD panels, and specifically colored LCD panels, a high efficiency light source must be used for illumination in order to achieve the requirements of small panel thickness, lightweight and low power consumption. The capability of achieving high brightness at a low power consumption is essential for obtaining a long battery life between recharging in portable applications for LCD. In recent years, the improvements made in the other parts of a LCD display, i.e., the color filter arrays, the thin film transistors, and other performance enhancement layers reduce the overall transmittance of a liquid crystal display panel. As a result, any improvement that can be made in the brightness/power ratio must be obtained from the improvement in the backlighting efficiency of a panel.

In the conventional backlighting technology for flat panel displays, cathode fluorescent lamps are frequently used to illuminate the flat panel display. The cathode fluorescent lamps provide the benefits of high luminous efficiency, long service life, lightweight and rugged structure. The lamps are normally installed in pairs along the sides of a display panel, e.g., a display panel in a notebook computer, with a light tube arrangement for creating uniform lighting across a diffuser screen. More recently improvements in backlighting have been provided which include a flat fluorescent backlight and a wedge-shaped light tube which distributes the light from a single bulb evenly over the entire display surface. The wedge-shaped construction allows a single lamp to illuminate the entire liquid crystal display panel. A plastic molded light tube which contains prismatic specular reflectors helps to spread the light uniformly across a front plane of the device.

The flat fluorescent lamp which has also been recently developed is used to directly illuminate a display panel. A typical construction of a flat fluorescent lamp device measures only 3 mm thick. Panel sizes ranging from diagonal lengths between 25 mm and 350 mm have been made by using the conventional cold cathode technology. The lamp housing can be constructed by using a formed plate and a flat plate laminated together. For instance, a typical lamp can be constructed of a serpentine channel of four intervals equipped with an electrode at each end. A typical design of the flat fluorescent lamp includes a phosphor coating on both a top and a bottom plate, while a reflective coating is placed only on the bottom plate. A high voltage of between 1 kV and 3 kV (depending on the panel size and cathode type) is normally required to operate a flat fluorescent lamp.

For a color liquid crystal display device, color filters in three basic colors of red, green and blue must be utilized. The manufacturing process for color filters involves a number of steps such as chemical vapor deposition, spin coating of insulators and metals, and the planarization and orientation film coatings. Color filters can be formed on glass substrates by complicated processing steps which include glass finishing and preparation of both the front and the back of a substrate, the polishing and lapping process, the washing and cleaning of the substrate, the coating, curing and other steps which must be performed on the substrate.

The formation of color filters requires a repetitive process to be carried out for forming the three primary color elements. In between the color elements, a black border or a black matrix is needed for providing the necessary contrast. To prepare the color filters, either an organic dye or a pigment can be used as long as it is suitable as a light absorbing color filter material. For instance, a gelatin can be deposited and dyed in successive photolithographic operations by using proximity printing equipment and standard photoresist materials. A pigment dispersion method can also be used which eliminates the gelatin layer and is capable of higher temperature stability. Other methods for forming color filters include electrodeposition and printing.

FIG. 1A shows a conventional color filter device 10 consisting of three primary color filters, i.e., red filter 12, green filter 14 and blue filter 16. A white light source 20 is used for backlighting the single pixel 10. In this conventional color filter/backlighting arrangement, a large area is occupied by a single pixel and as a result, the resolution achieved on a liquid crystal display panel is relatively poor.

In another conventional color filter/backlighting device 22, as shown in FIG. 1B, in the same area that was occupied by a single pixel where a white light backlighting is used, three pixels are arranged wherein each pixel can be one of the three primary colors by utilizing three different light sources 24, 26 and 28 for each pixel. Significantly improvement in resolution is therefore possible due to the greatly reduced sizes of the pixels. The color filters used in this arrangement, 30, 32 and 34 are essentially transparent for accepting a color from the color sources 24, 26 and 28. This arrangement is known as a sequential color display. In the sequential color display arrangement, a cathode-ray tube is normally employed as a light source that emits light at a plurality of wavelengths. Since there is an inherent light loss created by the polarization of the emitted light and the duty cycle of the liquid crystal cell, the maximum efficiency for the transmitted white light is reduced to as low as 25%. The display brightness in a field sequential color display is therefore a major concern.

It is therefore an object of the present invention to provide a flat fluorescent color lamp for liquid crystal display panel illumination that does not have the drawbacks and shortcomings of the conventional backlighting devices and color filters.

It is another object of the present invention to provide a flat fluorescent color lamp for liquid crystal display illumination that performs both the functions of a color filter and a backlight source.

It is a further object of the present invention to provide a flat fluorescent color lamp for liquid crystal display panel illumination by utilizing a lamp body constructed of serpentine-shaped channels for exhibiting the three primary colors of red, green and blue in at least one of such channels.

It is another further object of the present invention to provide a flat fluorescent color lamp for liquid crystal display panel illumination by utilizing a lamp body formed in a sintering process by glass powder, binder powder and a solvent which has at least three serpentine-shaped channels each exhibiting a primary color of red, green or blue.

It is still another object of the present invention to provide a flat fluorescent color lamp for liquid crystal display panel illumination by providing a lamp body constructed of at least three serpentine-shaped channels each filled with a fluorescent powder for exhibiting one of the three primary colors of red, green and blue when the powder is energized by an electrical charge.

It is yet another object of the present invention to provide a flat fluorescent color lamp for liquid crystal display panel illumination by providing a lamp body that is divided into at least three serpentine-shaped channels and equipping each channel with a pair of spaced apart electrodes.

It is still another further object of the present invention to provide a flat fluorescent color lamp for liquid crystal display panel illumination by providing a lamp body that is divided into at least three serpentine-shaped channels each filled with a gas capable of emitting ultraviolet energy to energize a fluorescent powder contained in the channel.

It is yet another further object of the present invention to provide a method for the color illumination of liquid crystal display panels by using a lamp body constructed of at least three serpentine-shaped channels each filled with a fluorescent powder and is capable of being energized by a gas filling the chamber to exhibit one of the three primary colors of red, green and blue.

SUMMARY OF THE INVENTION

In accordance with the present invention, a flat fluorescent color lamp for liquid crystal display panel illumination is provided which is constructed of a lamp body having at least three serpentine-shaped channels each filled with a different fluorescent powder and a gas capable of emitting ultraviolet energy to energize the fluorescent powder such that a primary color of red, green or blue is exhibited.

In a preferred embodiment, a flat fluorescent color lamp for liquid crystal display panel illumination is provided which includes a lamp body that is defined by two sidewalls, two end walls, a cover and a base forming a hermetically sealed chamber, a multiplicity of interior partitions within the chamber forming at least three serpentine-shaped channels, each of the at least three serpentine-shaped channels is filled with a substance such that one of the three color lights of red, green or blue is produced, at least three pairs of electrodes for providing electrical power to each of the at least three serpentine-shaped channels, each of the at least three pairs of electrodes is positioned spaced apart in one of the at least three serpentine-shaped channels in such a way that an electrical discharge occurs when an electrical power is applied to the electrodes, and a gas filling each of the at least three serpentine-shaped channels capable of emitting ultraviolet energy to energize the substance contained therein for producing one of the three primary colored lights of red, green or blue when the gas is charged by the electrical discharge.

In another preferred embodiment, a flat fluorescent color lamp for liquid crystal display panel illumination is provided which includes a lamp body defined by two sidewalls, two end walls, a cover and a base forming a hermetically sealed chamber, a multiplicity of interior partitions within the chamber forming three serpentine-shaped channels, each of the three serpentine-shaped channels is filled with a substance such that one of the three colored lights of red, green or blue is produced, three pairs of electrodes for providing electrical power to each of the three serpentine-shaped channels, each of the three pairs of electrodes is positioned spaced apart in the three serpentine-shaped channels in such a way that an electrical discharge occurs when an electrical power is supplied to the electrodes, and a gas filling each of the three serpentine-shaped channels capable of emitting ultraviolet energy to energize the substance contained therein for producing one of the three primary colored lights of red, green or blue when the gas is charged by the electrical discharge.

BRIEF DESCRIPTION OF THE DRAWINGS

Other objects, features and advantages of the present invention will become apparent upon consideration of the specification and the appended drawings, in which.

DETAILED DESCRIPTION OF THE PREFERRED AND ALTERNATE EMBODIMENTS

The present invention discloses a flat fluorescent color lamp for liquid crystal display panel illumination that has a lamp body formed by at least three serpentine-shaped channels each exhibiting one of the primary colors of red, green and blue such that when the different channels are turned on sequentially, red, green and blue lights emit from the lamp so that the color lamp serves the functions of both a backlight and a color filter.

Figure 2:
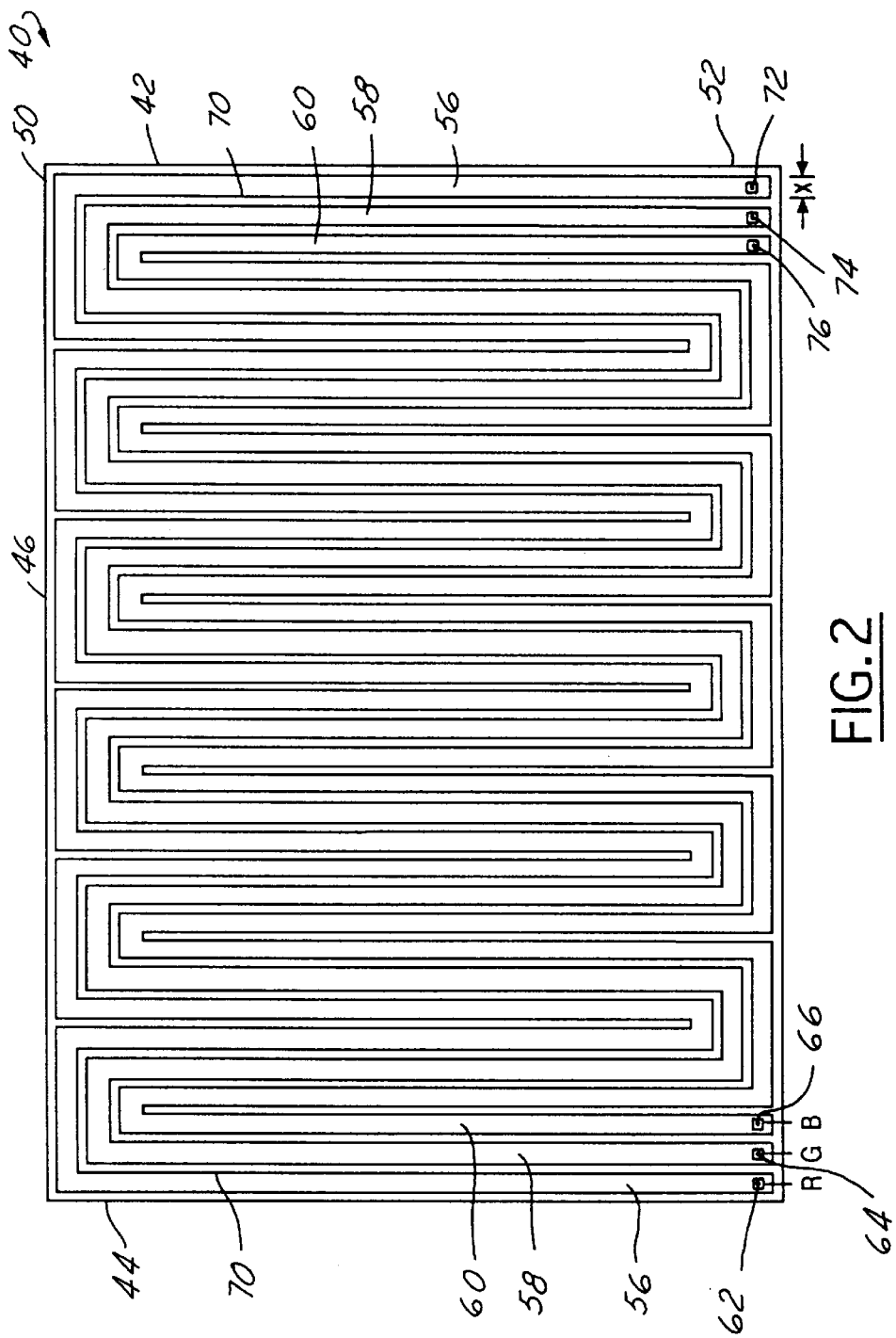
FIG. 2 is a schematic illustrating a plane view of a present invention serpentine-shaped flat fluorescent color lamp constructed by three separate channels.

Referring now to FIG. 2, where it is shown a schematic of a plane view of a preferred embodiment of the present invention novel flat fluorescent color lamp 40 in a serpentine structure. The color lamp 40 is constructed by two sidewalls 42, 44, two end walls 46, 48, a cover 50 and a base 52. The flat (or planar) fluorescent color lamp 40 is constructed of three serpentine-shaped channels 56, 58 and 60 each exhibiting one of the primary colors of red, green or blue, and not necessarily in that order. A pair of electrodes 62 and 72 are positioned at the two ends of channel 56 such that they are sufficiently apart. When an electrical power is applied to the electrodes 62 and 72, electrical discharge occurs in a gas contained in channel 56 such that a chemical substance, i.e., a fluorescent powder, contained in the channel can be energized to produce a red light. (The channel 56 is filled with a mixture of a noble gas and a small dosage of mercury, similar to fluorescent tube lamp, the visible light generation of the channel is achieved from the excitation of phosphorus by UV photon from mercury plasma discharge.) A suitable chemical substance, i.e., a suitable fluorescent powder for generating a red light upon energizing is $Y_2O_3$; Eu which emits a spectra that has a peak at 611 nm, and has a line band width.

Similarly, electrodes 64 and 74 are spaced apart and positioned in channel 58 which is filled with a fluorescent powder that upon electrical discharge generates a green colored light. A suitable fluorescent powder for generating a green light can be $LaPO_4$:Ce, Tb which exhibits a spectrum that has a peak at 544 nm and a line band width, or (CeTb) Mg $A_{-11}$, $O_{19}$ which exhibits a spectrum that has a peak at 543 nm and a line band width. Electrodes 66 and 76 are spaced apart and positioned in channel 60 which exhibits a blue light when an electrical power is supplied to the two electrodes and thereby generating an electrical discharge in the channel. A suitable fluorescent powder for generating blue colored light can be selected from $Sr_5$ $(PO)_3$ Cl:Eu which exhibits a spectrum that has a peak at 447 nm; $(SrCaBa)_5(PO_4)_3$Cl:Eu which exhibits a spectrum that has a peak at 453 nm, or $BaMg_2Al_{16}O_{27}$:Eu which exhibits a spectrum that has a peak at 450 nm. It should be noted that any other fluorescent powder can also be suitably used in the present invention novel apparatus as long as one of the primary colors of red, green or blue can be generated at a sufficient intensity.

It should also be noted that while red, green and blue are illustrated in FIG. 2 in channels 56, 58 and 60, the order of the colors can be arranged in any other desirable manner and does not have to be in the sequence as shown in FIG. 2. The electrodes 62–66 and 72–76 can be constructed in the same manner as those commonly used in fluorescent lighting fixtures and therefore its construction method is not described in detail here. The electrodes are usually positioned in a channel at a distance spaced apart from the cover 50 and the base 52 of a lamp 40.

The color lamp 40 is constructed by a plurality of interior partitions 70 within the lamp chamber to form serpentine-shaped channels 56, 58 and 60. The lamp body can be constructed by a variety of methods of which two are described here. One method for constructing the chamber is by etching a flat piece of glass such as PEG 3 glass supplied by HOYA Corporation, to form a plurality of cavities in the glass surface of serpentine-shape. A top glass plate is then laminated to the etched glass plate by using glass frits as an adhesive between the two plates. A second suitable method for forming the color lamp chamber is by a sintering process using ceramic powder. A suitable ceramic powder for such use contains a glass powder, a binder powder and a solvent. Suitable glass materials can be selected from those supplied by Ferro Corporation of Cleveland, Ohio. described as a product line of sealing glasses. For instance, a suitable grade of sealing glasses to be used in forming the present invention color lamp chamber is CF 1416, which is a vitreous glass with a thermal expansion coefficient of $81.0 \times 10^{-7}$/° C. (between 0~300° C.), an annealing point of 389° C., a softening point of 463° C., a density of 5.26 gm/cc, a sealing temperature of 513° C. and a sealing time of 15 minutes. Another suitable grade is a vitreous glass of CF 7555, which has a thermal expansion coefficient of $88.0 \times 10^7$/° C. (between 0~300° C.), an annealing point of 370° C., a softening point of 415° C., a density of 5.7 gm/cc, a sealing temperature of 450° C. and a sealing time of 15 minutes. These glass powders are generally available in the form of 100, 200 or 325 mesh powders which are suitable for the present invention application.

A suitable dimension for the present invention color lamp is a channel width (shown in FIG. 2 as X) of between about 1 mm and about 7 mm, and preferably between about 2 mm and about 5 mm. The thickness of the channel wall may be approximately 1 mm. The thickness of the color lamp, or the distance between the top cover 50 and the base cover 52 is approximately 6 mm. It should be noted that these dimensions may be changed to suit any specific applications which may require a different dimension.

Figure 1A:
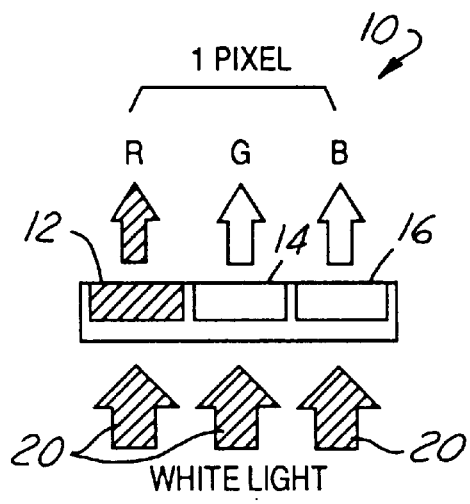
FIG. 1A is a schematic illustrating a conventional color light formed by color filters and a white light source.
Figure 1B:
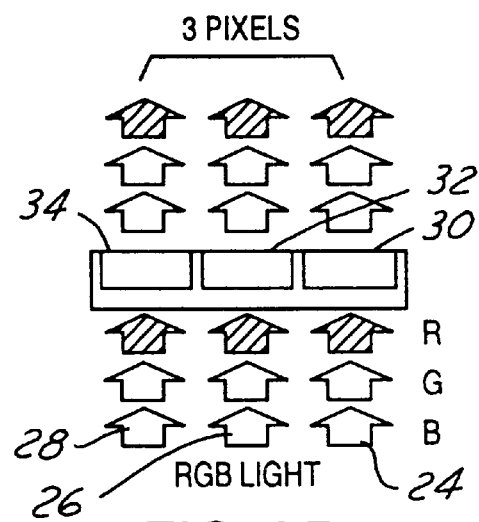
FIG. 1B is a schematic illustrating a conventional sequential color display device wherein each pixel displays red, green or blue.
Figure 3:
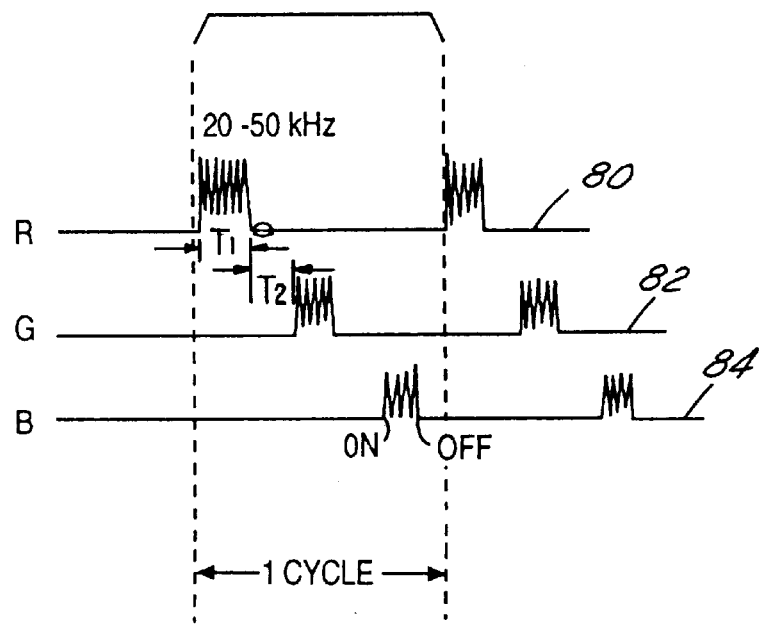
FIG. 3 is a schematic illustrating a timing sequence chart for the three primary colors of red, green and blue for the present invention color lamp.

The operation of the present invention flat fluorescent color lamp can be described in a timing sequence chart shown in FIG. 3. In FIG. 3, curves 80, 82 and 84 each represent a color light of red, green and blue, respectively. The curves 80–84 each represents a timing sequence chart for the turning-on/turning-off of each of the color lamps for emitting the three primary colors. The color lights can be generated at a high frequency between about 15 KHz and about 50 KHz. The red, green and blue lights can be turned on sequentially at a frequency of 60 Hz. The decay for phosphor is less than 0.1 m sec at 10 KHz. Since the red, green and blue lights are turned on sequentially at 60 Hz frequency, a complete cycle of the three colored lights sequentially turned on requires 16.7 m sec. This relates to 5.6 m sec for each colored light.

As shown in FIG. 3, the turn-on time $T_1$ for any of the three colors is approximately between 1~5 m sec, while the delay time T2 for the liquid crystal is approximately between about 1~2 m sec. The total of T1+T2 should be 5.6 m sec. This is the same for the three colors as shown by curves 80, 82 and 84. In a normal operation, the red light is first turned on, and then turned off. The green light is then turned on immediately after the red light is turned off, and remains on for a time period between 1~5 m sec. The blue light is then turned on after the green light is turned off for another turn-on time of between 1~5 m sec. The complete cycle for the turn-on/turn-off of all three colors repeats itself for approximately 60 times each second. This supplies a sufficient color response to a liquid crystal display panel for showing a color display at high resolution.

Figure 4:
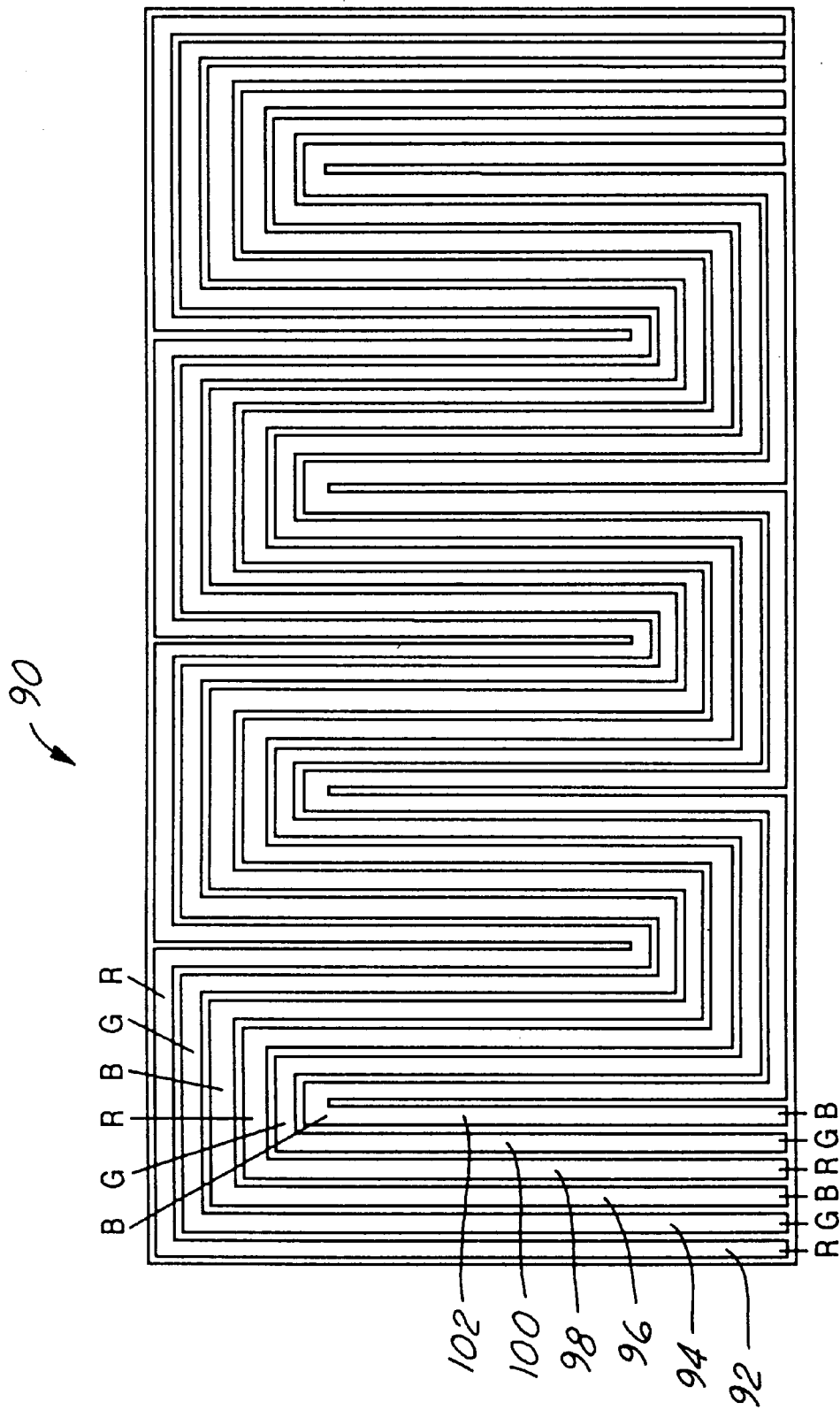
FIG. 4 is a schematic illustrating a plane view of an alternate embodiment of the present invention flat fluorescent color lamp constructed of six serpentine-shaped channels.

An alternate embodiment of the present invention novel flat fluorescent color lamp 90 is shown in FIG. 4. Instead of the three serpentine-shaped channel structure shown in the preferred embodiment of FIG. 2, the alternate embodiment shows that a total of six serpentine-shaped channels are provided in the lamp body. The six serpentine-shaped channels are arranged in an order of red, green, blue, red, green and blue or channels 92, 94, 96, 98, 100 and 102. It should be noted that, while not illustrated in FIG. 4, six pairs of electrodes are provided in the channels in a similar manner as that shown in FIG. 2 for the preferred embodiment. Similar fluorescent powders may also be used to provide the desirable color light. It should be further noted that the present invention novel color lamp is not limited to the use of six serpentine-shaped channels, an even larger number of channels may be suitably used if the channels can be constructed without significant difficulty.

The benefits and the advantages of the present invention novel flat fluorescent color lamp have been amply demonstrated by the above descriptions and the appended Figures. The major benefit provided is that by utilizing the present invention color lamp as a backlight source for a liquid crystal display illumination, the use of color fillers is no longer required. The present invention novel device therefore combines the desirable functions of a backlight and color filters into one convenient package which can be manufactured relatively easily and can be advantageously used for high quality color illumination at a low manufacturing cost.

While the present invention has been described in an illustrative manner, it should be understood that the terminology used is intended to be in a nature of words of description rather than of limitation.

Furthermore, while the present invention has been described in terms of a preferred and an alternate embodiment, it is to be appreciated that those skilled in the art will readily apply these teachings to other possible variations of the inventions.

The embodiment of the invention in which an exclusive property or privilege is claimed are defined as follows:

1. A fluorescent color lamp for LCD panel illumination comprising:

a lamp body having two sidewalls, two end walls, a cover and a base for forming a hermetically sealed chamber, a multiplicity of interior partitions within the chamber forming at least three serpentine-shaped channels, each of said at least three serpentine-shaped channels is filled with a substance such that one of the three colored lights of red, green or blue is produced, at least three pairs of electrodes for providing electrical power to each of the at least three serpentine-shaped channels, each of said at least three pairs of electrodes is position spaced apart in one of said at least three serpentine-shaped channels in such a way that an electrical discharge occurs when an electrical power is supplied to said electrodes, and a gas filling each of the at least three serpentine-shaped channels capable of emitting ultraviolet energy to energize the substance contained therein to produce one of the three colored lights of red, green or blue when said gas is charged by said electrical discharge.

2. A fluorescent color lamp according to claim 1, wherein each of said at least three serpentine-shaped channels exhibits a colored light that is different than the colored light exhibited by the two adjacent channels.

3. A fluorescent color lamp according to claim 1, wherein said multiplicity of interior partitions form three serpentine-shaped channels each adapted for emitting a red, a green and a blue colored light, respectively.

4. A fluorescent color lamp according to claim 1, wherein said multiplicity of interior partitions form six serpentine-shaped channels with two of said channels emitting red light; two of said channels emitting green light and two of said channels emitting blue light.

5. A fluorescent color lamp according to claim 4, wherein each of said channels is adjacent to two other channels on each side that emit a different colored light.

6. A fluorescent color lamp according to claim 1, wherein said substance is a powder capable of emitting a colored light when excited by an electrical discharge.

7. A fluorescent color lamp according to claim 1, wherein said substance is a phosphor powder.

8. A fluorescent color lamp according to claim 1, wherein said color lamp operates in a frequency range between about 15 KHz and about 60 KHz.

9. A fluorescent color lamp according to claim 1, wherein said lamp body is formed by etching a plurality of channels in a glass plate.

10. A fluorescent color lamp according to claim 1, wherein said lamp body is formed by a sintering process utilizing a glass powder and a binder powder.

11. A fluorescent color lamp according to claim 1, wherein said red, green and blue colored lights each turns on sequentially at a frequency between about 50 Hz and about 70 Hz.

12. A fluorescent color lamp according to claim 1, wherein said red, green and blue colored lights each turns on sequentially at a frequency of about 60 Hz.

13. A fluorescent color lamp according to claim 1, wherein each of said serpentine-shaped channels has a width between about 1 mm and about 7 mm, and preferably between about 2 mm and about 5 mm.

14. A fluorescent color lamp according to claim 1, wherein each of said at least three serpentine-shaped channels has a first end and a second end, a first electrode positioned in said first end and a second electrode positioned in said second end.

15. A fluorescent color lamp according to claim 1, wherein each of said at least three serpentine-shaped channels defines an electrical discharge chamber for emitting one of said red, green or blue light.

16. A flat fluorescent color lamp for LCD panel illumination comprising:

a lamp body having two sidewalls, two end walls, a cover and a base for forming a hermetically sealed chamber, a multiplicity of interior partitions within the chamber forming three serpentine-shaped channels, each of said three serpentine-shaped channels is filled with a chemical substance such that one of the colored lights of red, green or blue is produced, three pairs of electrodes for providing electrical power to each of the three serpentine-shaped channels, each of said three pairs of electrodes is positioned spaced apart in said three serpentine-shaped channels in such a way that an electrical discharge occurs when an electrical power is supplied to said electrodes, and a gas filling each of the three serpentine-shaped channels capable of emitting ultraviolet energy to energize the chemical substance contained therein to produce said one of each three colored lights of red, green or blue when the gas is charged by the electrical discharge.

17. A flat fluorescent color lamp according to claim 16, wherein each of said channels is immediately adjacent to two other channels that emit a different colored lights.

18. A flat fluorescent color lamp according to claim 16, wherein said chemical substance is a powder capable of emitting fluorescent light when excited by an electrical discharge.

19. A flat fluorescent color lamp according to claim 16, wherein said lamp body is formed by a sintering process utilizing a mixture of a glass powder and a binder powder.

20. A flat fluorescent color lamp according to claim 16, wherein each of said serpentine-shaped channels has a width between about 1 mm and about 7 mm, and preferably between about 2 mm and about 5 mm.

* * * * *